Patented Apr. 11, 1933

1,903,705

UNITED STATES PATENT OFFICE

YASUJURO NIKAIDO, OF BAY CITY, MICHIGAN

PRODUCTION OF CARBON OF HIGH ACTIVITY AND COVERING POWER

No Drawing.    Application filed January 10, 1930. Serial No. 420,020.

The present invention relates to the production of a carbon admirably adapted for decolorizing purposes, and having a high pigmentary value.

The present invention contemplates the production of carbon of high activity and covering power for carbonaceous raw materials, either in the solid or liquid state, but preferably from the latter. One of the important features of the process is the carbonization of the carbonaceous material, preferably after suitable preliminary treatment, with a flux fusible at the carbonization temperature. The use of a flux during the carbonization period increases the activity and covering power of the finished carbon, but it is preferred for optimum results to preliminarily treat the raw material, as hereinafter pointed out. Optimum results are obtained when the raw material containing potential volatile components is treated with a medium herein termed an expanding preventing agent, and which also functions as a gas-producing agent. Either of these steps, but preferably both, are combined with other steps of the process to produce the most satisfactory results.

The present invention is particularly applicable to the production of carbon from raw materials such as waste liquors from paper mills, and spent wash from distillery operations, the latter being technically known as slop. While it is preferred to work with liquor of the character specified, it is desired to point out that the process is applicable to various kinds of raw materials, either in the solid or liquid state, and of the latter the invention is not limited only to the liquors specified, but it is to be understood as suitable for liquors of equivalent chemical and physical characteristics.

Spent wash and similar liquor usually used for the preparation of carbon, contains a large amount of water, averaging approximately 90%. In order to condition the liquor so that it may be advantageously treated, it is first concentrated by vacuum concentration or the like until it contains a proper consistency by evaporation of its evaporatory constituents. This results in the elimination of a large amount of the water content. Preferably, the liquor is concentrated until it contains approximately 80% of solids. The degree of concentration may be somewhat lower or higher, but most satisfactory results are obtained at this degree of concentration, as the concentrated liquor is not too viscous for handling and there is not an excessive amount of water to be removed by subsequent treating. This degree of concentration which has been arrived at after numerous experiments, gives optimum results.

The concentrated liquor, which has to be treated for the production of carbon, expands excessively during the drying step, and the carbonization period, causing great difficulties. Further, if this liquor is carbonized by the usual process, the final carbon is of relatively poor activity and covering power. A careful investigation as to the cause of these defects leads to the conclusion that the excessive expansion is due to the presence of salts of volatile organic acids. It has been found that the trouble due to the presence of these salts may be obviated by treating the concentrated liquor with an expanding-preventing agent. Various agents are adapted for this purpose, but most satisfactory results have been obtained by the use of sulphuric acid. If the concentrated liquor is treated prior to the drying operation with sulphuric acid, for example of 60° Bé., in various amounts, depending on the nature and concentration of the material, the expansion is substantially eliminated. Experiments indicate that addition of between 8 to 20% of 60° Bé. sulphuric acid on the weight of concentrated liquor of 80% dry substance gives most satisfactory results, although, as indicated, this figure may vary. Treatment with the expanding-preventing agent liberates the volatile components of the liquor, including the volatile acids, and the drying and carbonizing steps will proceed with substantially no expansion or swelling.

Not only does the expanding-preventing agent function as described, but it also assures a carbon of high activity. Experiments indicate that carbon produced without the addition of such agent has a relatively low decolorizing power.

Concentrated liquor, treated as described, is dried and the dried material is pulverized to a suitable fineness, for example, so that it will pass through 60 mesh. Experiments show that the temperature of drying has a considerable influence on the character of the final carbon. It has been ascertained that the drying shall be carried out at a temperature between 100° C. and 130° C. The temperature of drying may be raised somewhat higher, as for example to 150° C. It is desired to indicate that these are the preferred temperatures which are used in connection with the other steps of this process. While other drying temperatures may be used, the preferred results are obtained by the temperatures set forth. The important point to bear in mind is that it is desirable to dry, and this preferably at the temperatures indicated, before carbonization, since if the concentrated liquor is subjected to carbonization without a preceding drying or desiccating step, it will swell or expand excessively in the carbonization apparatus, thereby causing considerable trouble, and further the resulting carbon does not appear to be as active as when produced by carbonizing after the drying step. It is to be understood that while the other steps of the process may be carried out without the drying step, as will hereinafter be pointed out, optimum results are obtained when the drying step is used, and more particularly when the desiccation is carried out at the temperatures indicated.

For the best results, it is desirable that the dried concentrate, which has been treated with an expanding preventing agent, have mixed therewith a gas producing agent functioning to make the carbonized material more porous and amorphous, and consequently more active. Sulfates of the alkaline earth metals, such as sulfate of calcium, barium, strontium, or magnesium, or sulfates of the heavy materials such as iron, either ferrous or ferric, aluminum, manganese, zinc and the like, all of which are decomposable in the presence of carbon at the carbonization temperature, may be mixed as a gas producing agent with carbonaceous material prior to carbonization. An analysis of the gas produced when mixing such materials with the carbonaceous material and carbonizing shows the same to comprise carbon monoxide, carbon dioxide, ammonia, methylamines, sulfur dioxide, and carbon oxysulphide, indicating thereby decomposition of sulphates and production of gases. As indicated, the gas producing agent, such as sulfate, may be mixed with the dried material. However, it is preferable to mix the gas producing agent with the concentrated liquor before drying, as a more thorough mixture can be obtained in the wet state and additionally, the addition of solid substances to the material facilitates the drying operation.

It is preferred to mix the gas producing agent with the concentrated liquor. However, experiments were carried out without the use of any gas producing agent. In some liquors, a carbon was produced when no gas producing agent was used, which was as active as that produced when a gas producing agent was used, and the other steps of the process carried out. Experiments were made to ascertain the cause of this irregularity. Various kinds of spent liquors were analyzed for their mineral contents. The analysis showed that the concentrated spent liquor containing 80% dry substance contained from 2.5 to 5.0% calcium oxide, 1.0 to 1.5% magneisum oxide; .5 to 1.0% iron oxide and alumina, 2.0 to 3.0% potash, and .25 to .50% soda.

The experiments indicate that the liquors containing high percentages of mineral contents, such as alkaline earths and heavy metals, produce carbon of higher activity and better covering power than liquors containing a less amount of these ingredients. When the liquors containing less amounts of mineral contents and producing carbon of relatively poor activity were supplied with additional mineral content in such a quantity as to make the percentage equal to that present in the spent liquors giving carbon of high active power, the carbon produced by liquors of low mineral content were approximately as active as that produced by the liquor containing higher percentages of these mineral constituents.

It has been discovered that the amount of the mineral constituents required to give a carbon of high activity is about 4% to 6% alkaline earth or heavy metal of the weight of the concentrated liquor containing 80% dry substance, these mineral constituents preferably being alkali. It has been found that if liquors containing various percentages of mineral constituents are mixed in such a proportion as to make the mineral content equal to the requisite amount, as pointed out the carbon obtained from such a mixture is very highly active. Therefore, by proper analysis, and proper handling and mixing of the various liquors, the addition of decomposable mineral substances may be dispensed with. Probably the mineral substances of the alkaline earth group and heavy metal group present in the liquor combine with the expanding preventing agent used in a previous step of the process, preferably sulphuric acid, forming sulfates, and the sulfates thus formed, being decomposible at carbonization temperature, produce gases which work conjointly with the gases derived from carbohydrates to produce a favorable formation of porous and amorphous carbon.

However this may be, it is not desired to be limited as to any theory of what occurs. The steps of the process have been set forth and this complies with the statutes.

One of the features of the present invention is the carbonization of the dried carbonaceous material, preferably treated with an expanding preventing agent and a gas producing agent, as previously set forth, with a substance which is fusible at the temperature of carbonization; this substance, herein termed a flux, functioning to increase the activity and covering power of the finished carbon. The best results are obtained when this step of the process is carried out in conjunction with the treatment of the concentrated liquor with an expanding preventing agent, as for example, sulphuric acid, and a gas producing agent, as for example, a sulphate of an alkaline earth or heavy metal.

It is not known just exactly what occurs when a carbonaceous material is heated at the carbonizing temperature with a fusible agent or flux. However, it is thought that carbon heated at high temperatures loses its amorphous character, becoming more or less crystalline, and consequently less active. This is probably what takes place to a large extent during the carbonization period. When a substance which is readily fusible at carbonization temperatures is mixed in a large quantity with the material to be carbonized, prior to carbonization, the carbon atoms, as soon as they are set free from carbohydrates or other carbonaceous substances during carbonization, will be surrounded and separated by foreign substances in such a manner that the atoms will not be close enough to attract each other to form crystals. Again, it is not desired to be limited by any theory as to what occurs. It has been, however, empirically ascertained that when a flux is present during carbonization, a carbon of higher activity and greater covering power is obtained as compared to carbons prepared without the use of a flux.

The substances to be used for interposition between carbon atoms, which has herein been termed flux, may be any substance or substances fusible at the carbonization temperature. Sulfates, sulfites, sulfides, carbonates and hydroxides preferably of the alkali metals may be used. Borax and potassium ferrocyanide or sulphocyanide are also suitable. All of these substances work with equal effectiveness. It is, however, preferred to use a potassium salt, or salts, as a flux for the reason that one of the principal mineral constituents of distillery spent wash is potash, and the recovery of the potash may be more readily accomplished if potassium salts are used as a flux. Recovery of the flux would be more complicated and difficult if large amounts of sodium salts were present. The flux or the reaction-product from the use thereof may be recovered, concentrated, and used over indefinitely. It will increase in quantity after each carbonization, as the result of the acquisition of mineral constituents from the material carbonized. When using potassium compounds as a flux, these compounds lose their original identity after a few carbonizations, due to chemical interactions during carbonization. However, they still remain substantially as potassium compounds. Analyses which have been made indicate that the flux, after a few carbonizations, becomes a mixture of sulfite, sulfate, sulfide, carbonate, hydroxide, and ferrocyanide, even if only one potassium compound is used as the flux in the initial carbonization and the compounds mentioned will appear in the form of potassium salts. When the materials to be carbonized, as for example sulfite liquor from paper mill operations, contain very small amounts of potash, recovery of which is of little consequence, or when the materials to be carbonized, as for example waste soda liquor from paper mill operations contain a large amount of soda, recovery of which is of importance, the preferred flux agent is a sodium compound.

The addition of the flux to the material to be carbonized may be accomplished either in the wet or dry state with approximately equal effectiveness. In dry mixing, the material to be carbonized and the flux are pulverized and mixed as thoroughly as possible. In wet mixing, the flux is dissolved in a small amount of water and heated to boiling. The heated solution carrying the flux is added to the pulverized material and thoroughly mixed therewith. The mixture is then heated until it becomes very nearly dry, and thereafter is transferred to the carbonization apparatus. Wet mixing is preferred, as a more thorough mixture may be accomplished in the wet state.

The amount of flux which is to be added to the carbonaceous material may vary, depending somewhat on the physical and chemical character of the material. Experiments indicated that the variation to obtain satisfactory results ranged between 70% and 120% of flux on the weight of dried material. However, satisfactory results are generally obtained when the amount of flux is equal in weight to the amount of dried material.

It is preferred to carry out the step of treating the carbonaceous material with flux at the carbonization temperature, with the prior step of treating the liquor with a concentrated expanding-preventing agent, and preferably sulphuric acid. The best results have been obtained when the concentrated liquor was treated with an acid, such as sulphuric acid, and then carbonized at carbonization temperatures, for example 700 to 900° C. in the presence of a flux as specified, the carbonization being, of course, carried out with a substantially complete exclusion of air.

It may be indicated that other acids such as phosphoric acid instead of sulphuric acid may be used, but that the preferred results are produced when using sulphuric acid.

The following is a specific example, illustrating one way of carrying out the invention: A quantity of concentrated spent wash, containing approximately 80% of dry substance, is treated with about 10% of its weight of an expanding-preventing agent, preferably sulphuric acid of 60° Bé., and dried in a hot air oven at approximately 130° C. If the concentrated spent wash contains mineral constituents approximating 4% to 6% of its weight of minerals of the alkaline earth group or heavy metal group, it is not necessary, as has been previously pointed out, to add a gas producing substance. However, if this is not the case, about 6% of ferric or ferrous sulfate or calcium sulfate, measured by the weight of the liquor treated, is added to the concentrated liquor, preferably prior to the addition of the sulphuric acid. The weight of the dried material obtained from the treatment set forth was about 70% of the original weight of the concentrated spent wash. The dry material containing carbonaceous components is then pulverized to pass through a 60 mesh screen. The mesh may be considerably varied, but this is illustrative of the preferred mesh. The dry material, ground to the mesh specified, is then mixed with a quantity of flux, preferably equal to its own weight. This mixing is preferably carried out, as previously pointed out, in a wet state. The resulting mixture is then heated until most of the moisture is eliminated. The mixture is thereafter transferred to a retort, amply airtight, and provided with a vent pipe for allowing the gases to escape, and subjected to carbonization at an external temperature varying from 700 to 900° C. until the evolution of gas has ceased. The retort is allowed to cool and the contents then discharged into a vessel containing a small quantity of water, the vessel being heated in order to allow the substances used as a flux to dissolve. The mixture is filtered and the residue washed with water. The filtrate is concentrated to be used again as a flux in future carbonization. The carbon at this point contains sulfides, oxides and carbonates of the metals which were formed from the original or added mineral constituents present in the material. These impurities are removed by dissolving in a suitable acid, such as hydrochloric acid, and washing with water to a neutral point. The washed carbon is then dried in a hot air oven preferably at a temperature of about 105° C. The yield of dry carbon is approximately 10 to 13% of the concentrated spent wash used. The carbon thus obtained is extremely porous and amorphous. Calculations show that one cubic foot of the carbon will weigh only about 7 pounds.

In order to determine the relative merit of the carbon, a sample of filter char which is stated to be the best on the market, and designated herein as D, was purchased and comparative tests were made. The tests were made as follows: 20 grams of black strap molasses were dissolved in distilled water, transferred to a 500 cc. flask and filled up to the 500 cc. mark with distilled water. Exactly 0.75 grams of D was placed in a test tube and 0.375 grams of the carbon produced in the present process was placed in another test tube of the same dimension. By means of a pipette, 15 cc. of the black strap molasses solution previously referred to was introduced into each test tube and shaken for four minutes. The contents of each test tube was thereafter filtered through a 9 cm. filter paper. D required twenty-five minutes to complete the filtration. The filtrate was light amber color. The carbon produced by the present process required six minutes to complete filtration, and the filtrate was water white. Keeping other conditions equal, the weight of the carbon produced by the present invention was reduced to 0.3 gram in order to effect the same degree of decolorization as 0.75 grams of D. This indicates that the carbon produced by the present invention is two and one-half times as active as D. The speed of filtration of the carbon produced by the present invention is four times that of D. Comparative tests of the carbon produced by the present invention and bone black indicate that the decolorizing power of 0.25 grams of the former is equal to that of 1.75 grams of bone black, indicating that the carbon produced by the present invention is seven times as active as bone black as a decolorizing agent. The speed of filtration of the carbon produced by the present invention is about ten times that of bone black.

To determine the merit of the carbon produced by the present invention as a pigment, experiments were carried out to determine its covering power. For this purpose, there was purchased a sample of the best carbon black on the market, designated B., selling for fifty cents per pound. Exactly 0.1 gram of the carbon produced by the present invention and also 0.1 gram of carbon designated as B were weighed and each spread separately on equal surfaces of 59 square inches area of a white board. The carbon was quickly distributed over the entire surface. Examination after drying showed that the surface covered by the carbon of the present invention was much blacker than that covered by B. The surface on which the carbon produced by the present invention was spread was extended by fifteen square inches. At this point, the intensity of blackness of B. appeared to be the same as that produced by the present invention.

Comparative tests showing the covering power of B. show that equal amounts of the carbon will cover for B. 59 square inches, and for the carbon of the present invention 75 square inches, indicating that the covering power of the carbon produced by the present invention is 27% greater than that of B., which is presumed to be the best carbon black on the market.

A carbon produced in accordance with the present invention has a low ash content approximating 0.25%. The ash content is one of the most important properties of carbon considered from a pigmentary standpoint. Carbon black made from natural gas and generally used as a pigment contains only about 0.06% ash. However, carbon made by carburizing carbonaceous material usually has, as far as I am aware, a very high ash content. For example, the carbon designated D in the above description contains about 30% ash. Other carbons made by carbonization processes which I have tested contain from 2 to 7% ash. It is primarily for this reason carbon made by any of the carbonization processes now in use finds comparatively little demand as a pigment.

Carbon made in accordance with the present invention has a very low weight per unit volume, approximating 7 pounds per cubic foot. Experiments have been carried out to produce carbons by various carbonization processes. In all cases, the weight per unit volume was considerably higher than the carbon produced by the present process, the weight per cubic foot averaging in the neighborhood of 10 pounds. The volume weight of carbon is significant, as it indicates the porosity thereof; the lower the volume weight, the higher the porosity of the carbon. Further, porosity indicates to a certain extent the activity of the carbon.

The speed of filtration of the carbon made in accordance with the present invention, is considerably higher than any carbon now upon the market. As previously set forth, the time required by carbon made in accordance with the present invention for filtering various materials varies from ¼ to ⅙ that required by standard carbon designated as D. Experiments have been carried out, utilizing carbons made by other carbonization processes, as to the relative speed of filtration, as well as decolorizing power. In all the tests, it was found that the carbon prepared in accordance with the present invention filters in ⅙ of the time of that required by any of the carbons now on the market. The speed of filtration is of great importance from a practical standpoint, as an increase in speed will increase the capacity of the filtering apparatus per unit of time.

What I claim is:

1. The process of making a carbon of high activity and covering power comprising treating a liquor having present water soluble carbonaceous material and containing potential volatile components with a strong mineral acid in a quantity sufficient to liberate the said volatile components and to prevent expansion of the material during drying and carbonization, drying at a temperature insufficient to carbonize, and thereafter carbonizing in the presence of a flux fusible at the carbonization temperature.

2. The process of making a carbon of high activity and covering power comprising treating a liquor having present water soluble carbonaceous material and containing potential volatile components with sulphuric acid in a quantity sufficient to liberate said volatile components and to prevent expansion of the material during drying and carbonization, drying at a temperature insufficient to carbonize, and thereafter carbonizing in the presence of a flux fusible at the carbonization temperature.

3. The process of making a carbon of high activity and covering power comprising treating a liquor having present water soluble carbonaceous material and containing potential volatile components with a strong mineral acid in a quantity sufficient to liberate said volatile components and to prevent expansion of material during drying and carbonization, drying the reaction product at a temperature insufficient to carbonize, and thereafter carbonizing in the presence of a flux fusible at the carbonization temperature.

4. The process of making a carbon of high activity and covering power comprising treating a liquor having present water soluble carbonaceous material and containing potential volatile components with a strong mineral acid acting to liberate the same and to prevent expansion of the material during drying and carbonization, drying the reaction product at a temperature varying approximately between 100° C. and 160° C., and thereafter carbonizing in the presence of a flux fusible at the carbonization temperature.

5. The process of making a carbon of high activity and covering power comprising treating a liquor having present water soluble carbonaceous material with sulphuric acid adapted to liberate volatile components and to prevent expansion of the material during drying and carbonization, drying the reaction product at a temperature varying approximately between 100° C. and 160° C., and thereafter carbonizing in the presence of a flux fusible at the carbonization temperature.

6. The process of making a carbon of high activity and covering power comprising treating a liquor having present water soluble carbonaceous material with approximately 8% to 20% of sulphuric acid adapted to liberate the volatile components and to prevent expansion of the material during drying and carbonization, drying the reaction product at a temperature insufficient to carbonize the same, and thereafter carbonizing in the presence of a flux fusible at the carbonization temperature.

7. The process of making a carbon of high activity and covering power comprising treating a liquor having present water soluble carbonaceous material with approximately 8% to 20% of sulphuric acid, drying the reaction product at a temperature varying approximately between 100° C. and 160° C., and thereafter carbonizing in the presence of a flux fusible at the carbonization temperature.

8. The process of making carbon of high activity and covering power from liquor containing carbonaceous material comprising concentrating the liquor, adjusting the mineral contents of the concentrated liquor by adding a sulphate of the group comprising alkaline earth metals and heavy metals so that the concentrated liquor of 80% dry substance contains approximately 4% to 6% minerals of said group, drying the said liquor, and carbonizing the dried carbonaceous material in the presence of a flux fusible at the carbonization temperature.

9. In the process of producing carbon of high activity and covering power from concentrated carbonaceous liquor, the steps of adjusting the mineral contents of the liquor so that about 4% to 6% of minerals of alkaline earth group and heavy metal group is present in the concentrated liquor containing 80% dry substance, drying, and carbonizing the resulting product.

10. The process of making a carbon of high activity and covering power comprising concentrating a liquor container water soluble carbonaceous material, mixing therewith a sufficient quantity of a sulphur containing gas producing agent functioning to produce sulphur containing gas during the carbonization step and thereby increase the porosity and activity of the resulting carbon, adding a strong mineral acid in a quantity sufficient to liberate volatile components and prevent the expansion of the material during drying and carbonization, drying the reaction product at a temperature insufficient to carbonize the same, and thereafter carbonizing in the presence of a flux fusible at the carbonization temperature.

11. The process of making a carbon of high activity and covering power comprising concentrating a liquor containing water soluble carbonaceous material, mixing therewith a sufficient quantity of a sulphur containing gas producing agent functioning to produce sulphur containing gas during the carbonization step and thereby increase the porosity and activity of the resulting carbon, adding sulphuric acid in a sufficient quantity to liberate the volatile components of the mixture and prevent the expansion of the material during drying and carbonization, drying the reaction product at a temperature insufficient to carbonize the same, and thereafter carbonizing in the presence of a flux at the carbonization temperature.

12. The process of making a carbon of high activity and covering power from liquor containing water soluble carbonaceous matter comprising concentrating the liquor, treating the same with a sufficient quantity of a sulphur containing gas producing agent functioning to produce sulphur containing gases during the carbonization step and thereby increase the porosity and activity of the carbon, drying the so treated liquor at a temperature insufficient to carbonize the same, and carbonizing the dry material in the presence of a flux fusible at the carbonization temperature.

13. The process of making a carbon of high activity and covering power from liquor containing water soluble carbonaceous matter comprising concentrating the liquor, treating the same with a sufficient quantity of a sulphate of the group comprising alkaline earth metals and heavy metals functioning to produce sulphur containing gases during the carbonization step and thereby increase the porosity and activity of the carbon, drying the so treated liquor at a temperature insufficient to carbonize the same to produce a solid material, and carbonizing the latter in the presence of a flux fusible at the carbonization temperature.

14. The process of making a carbon of high activity and covering power comprising treating a liquor having present water soluble carbonaceous material with approximately 8 to 20% of a strong mineral acid adapted to liberate the volatile components and to prevent expansion of the material during drying and carbonization, drying the reaction product at a temperature insufficient to carbonize the same, and thereafter carbonizing in the presence of a flux fusible at the carbonization temperature.

In testimony whereof I hereunto affix my signature.

YASUJURO NIKAIDO.